(12) United States Patent
Wiberg et al.

(10) Patent No.: US 8,036,327 B2
(45) Date of Patent: Oct. 11, 2011

(54) ADAPTIVE CHANNEL MEASUREMENT REPORTING

(75) Inventors: Niclas Wiberg, Linkoping (SE); Anders Furuskar, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1366 days.

(21) Appl. No.: 10/596,613

(22) PCT Filed: Dec. 19, 2003

(86) PCT No.: PCT/SE03/02039
§ 371 (c)(1),
(2), (4) Date: Jun. 19, 2006

(87) PCT Pub. No.: WO2005/060190
PCT Pub. Date: Jun. 30, 2005

(65) Prior Publication Data
US 2007/0064772 A1 Mar. 22, 2007

(51) Int. Cl.
*H04B 1/10* (2006.01)
(52) U.S. Cl. ....................................... 375/350
(58) Field of Classification Search .................. 375/140, 375/144, 230, 232, 267, 340, 341, 343, 346, 375/349, 350, 260; 455/59, 69, 115.1, 522, 455/213, 232.1, 334
See application file for complete search history.

(56) References Cited

U.S. PATENT DOCUMENTS

| | | | | |
|---|---|---|---|---|
| 6,154,485 A * | 11/2000 | Harrison | ........................ | 375/130 |
| 6,907,270 B1 * | 6/2005 | Blanz | ........................ | 455/562.1 |
| 7,209,433 B2 * | 4/2007 | Scarpa | ........................ | 370/206 |
| 7,280,809 B2 * | 10/2007 | Lauterbach et al. | ........ | 455/115.1 |
| 2002/0060990 A1 * | 5/2002 | Bohnke et al. | ................. | 370/270 |
| 2002/0065047 A1 * | 5/2002 | Moose | ........................... | 455/63 |
| 2002/0131486 A1 * | 9/2002 | Haartsen | ........................ | 375/229 |
| 2003/0012308 A1 * | 1/2003 | Sampath et al. | ............... | 375/340 |
| 2003/0058929 A1 * | 3/2003 | Cox et al. | ........................ | 375/150 |
| 2004/0044506 A1 * | 3/2004 | Meinila et al. | ..................... | 703/5 |

OTHER PUBLICATIONS

Barbarossa, S. et al. "Theoretical Bounds on the Estimation and Prediction of Multipath Time-Varying Channels". IN: IEEE International Conference on Acoustics, Speech, and Signal Processing, 2000. ICASSP '00. Proceedings. 2000. Istanbul, Turkey Jun. 5-9, 2000, vol. 5, pp. 2545-2548, INSPEC AN: 6770444, see chapter 1. Introduction and Abstract.

Visotsky, E. et al. "Space-Time Transmit Strategies and Channel Feedback Generation for Wireless Fading Channels", IN: Conference Record of the Thirty-Fourth Asilomar Conference on Signals, Systems and Computers, 2000. Pacific Grove, CA, USA, Oct. 29-Nov. 1, 2000, vol. 2, pp. 1593-1597, INSPEC AN: 7042318, see chapters 3. Analog Feedback and 4. Filter Designs.

(Continued)

*Primary Examiner* — David C. Payne
*Assistant Examiner* — Syed Haider

(57) ABSTRACT

The present invention relates to a method, arrangements, and a message format for achieving an improved and adaptive reporting of measurements for a communication channel between a transmitter and a receiver unit. The invention achieves a message format for providing detailed channel information to a transmitter unit but requiring a minimized amount of transmission capacity. The receiver unit delivers preferably incremental updatings of the filter function, represented in the time- or frequency domain, of the entire channel between transmitter and receiver. For this purpose the channel representing function is divided into a number of sub-functions, a function of which corresponding to the true channel filter function, and whereof the various sub-functions contain channel information of a ranked degree of significance.

16 Claims, 3 Drawing Sheets

OTHER PUBLICATIONS

Gerlach, D. et al. "Adaptive Transmitting Antenna Arrays with Feedback" In: IEEE Signal Processing letters, Oct. 1994, vol. 1, pp. 150-152, ISSN: 1070-9908, INSPECT AN: 4801676, see chapters II Problem statement and assumpt. III Incorporation of feedback.

Papantoniou, S.J. "A Multipath Channel Model for Mobile-Radio Communications" In: Third IEEE International Symposium on Personal, Indoor and Mobile Radio Communications, 1992, Proceedings, PIMRC '92, Boston, MA, USA, Oct. 19-21, 1992, pp. 92-97, INSPEC AN 4635478, see Abstract.

* cited by examiner

| T/F | α | $t_s/f_s$ | ...... | $\tau_i/f_i$ | $A_i$ | $\varphi_i$ | .......... |

ADAPTIVE CHANNEL MEASUREMENT REPORTING

FIELD OF THE INVENTION

The present invention relates to a method and arrangements for achieving an improved and adaptive reporting of measurements for a communication channel between a transmitter and a receiver unit.

BACKGROUND OF THE INVENTION

Communication channels in telecommunication systems can often be measured with a sufficiently good accuracy in a receiver unit but often not in the transmitter unit. However, transmitter units in communication systems can benefit from knowing the properties of said channels through adapting the transmitted signal, e.g., power, frequency, modulation scheme, or coding to said channel properties. It is therefore desirable to report results of channel measurements from a receiver unit, which can perform such measurements with the necessary accuracy, to the transmitter unit, which needs indications of such measurements for adaptation of the transmitted signal.

In a prior art solution, which is used in present communications systems, e.g. GSM-systems or WCDMA-systems, mobile terminals can be instructed to periodically report the downlink channel quality to the transmission unit in the network. This can be used for, e.g., Transmit Power Command (TPC-) messages, which are derived inter alia from the receiver's perception of the downlink channel, and transmitted back to the transmitter unit as an incremental value to increase or decrease the downlink transmission power. This is described, e.g., in the technical specification TS25.214 (V.5.0.0) issued by the $3^{rd}$ Generation Partnership Project (3GPP). A low-detail knowledge of the channel, e.g. as a representation of the channel quality, can be useful to adapt the bit rate, and coding and modulation formats in the transmitter. However, such simple channel quality reporting provides a too low level of detail for advanced adaptation of the transmitted signal, e.g. allocation of and power control for sub-carriers in an OFDM system, and is thus not useful for systems employing such techniques.

SUMMARY OF THE INVENTION

It is desirable that the transmitter unit has a good knowledge of channel properties between transmitter and receiver unit. However, when providing such information from the transmitter unit to the receiver unit it has been observed to be a problem that a representation of the channel function comprising a sufficiently large accuracy implies a considerably large amount of information that must be sent. This problem is not solved by corresponding solutions according to the state of the art.

Therefore, it is the object of the present invention to achieve a method and arrangement providing a message format, which provides detailed channel information to a transmitter unit but requiring a minimised amount of transmission capacity.

It is the principal idea of the present invention that the receiver unit delivers preferably incremental updatings of the filter function, represented in the time- or frequency-domain, of the entire channel between transmitter and receiver. For this purpose the channel representing filter function is divided into a number of sub-functions, a function of which corresponding to the true channel filter function, and whereof the various sub-functions contain channel information of a ranked degree of significance.

This idea is realised by the method and arrangement according to the present invention comprising a improved message format for transmitting channel function information to the transmitter. Said message format includes information about at least a selection of the updated sub-functions of the channel function along with an indication of the channel information and function type.

It is an advantage of the present invention that the transmitter unit obtains with a comparatively low amount of signalling capacity a sufficiently detailed knowledge of the transmission channel between transmitter and receiver unit.

It is thus another advantage of the present invention that the transmitter unit can in a fast manner adapt its transmission power to the necessary level.

Particularly in OFDM-based systems a detailed knowledge of the channel filter function, as provided by the present invention, allows, e.g., an efficient allocation of sub-carriers to users and individual power control of said sub-carriers, e.g. through so-called water-filling (cf. Thomas M. Cover and Joy A. Thomas, *Elements of Information Theory*, John Wiley&Sons, 1991, Section 10.4.) along with an individual adaptation of modulation and channel coding per sub-carrier. These advantages in turn enable a more efficient utilization of the channel, and thereby higher system capacity.

Other objects, advantages and novel features of the invention will become apparent from the following detailed description of the invention when considered in conjunction with the accompanying drawings and claims.

For a better understanding, reference is made to the following drawings and preferred embodiments of the invention.

BRIEF DESCRIPTION OF THE DRAWINGS

FIG. 2a illustrates an example of a channel impulse response, e.g. for a transmission channel as shown in FIG. 1, while

FIG. 3 shows an example of a channel measurement message format according to the present invention.

DETAILED DESCRIPTION

Figure 1:
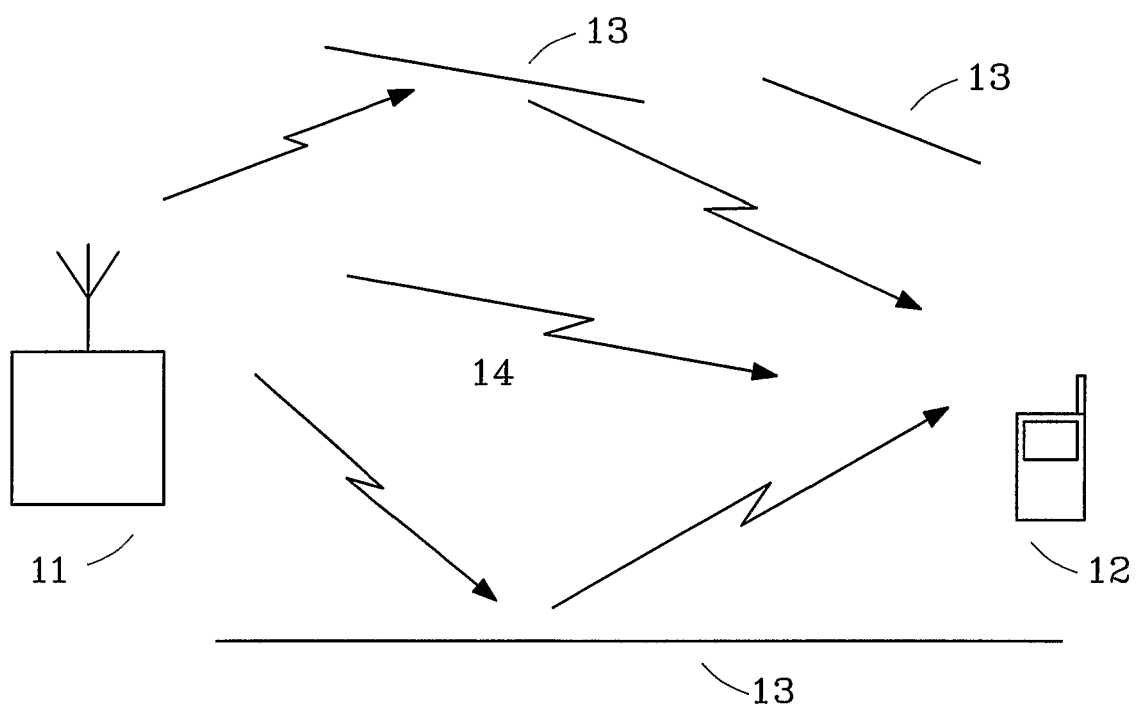
FIG. 1 illustrates a transmitter unit and a receiver unit communicating with each other via a multipath channel.
Figure 2A:
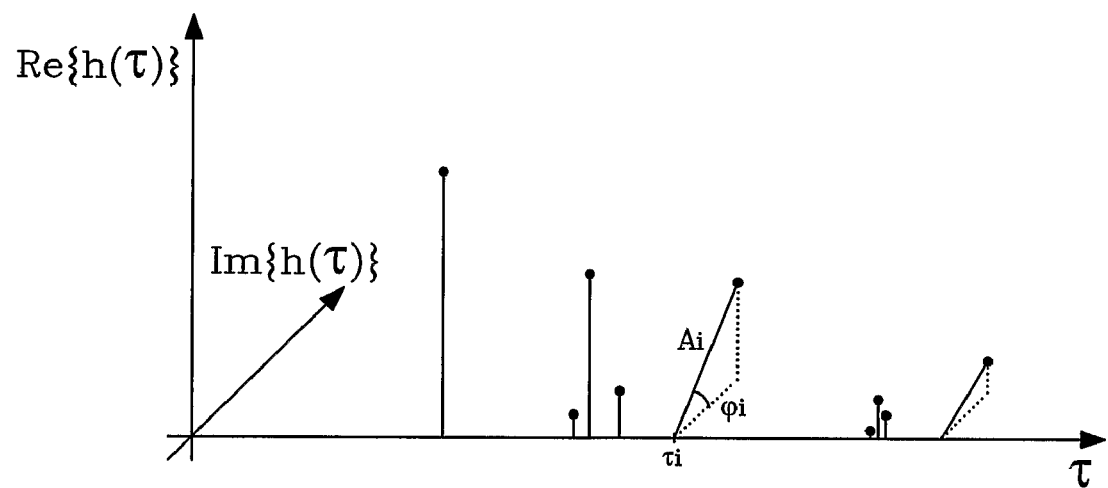
Figure 2B:
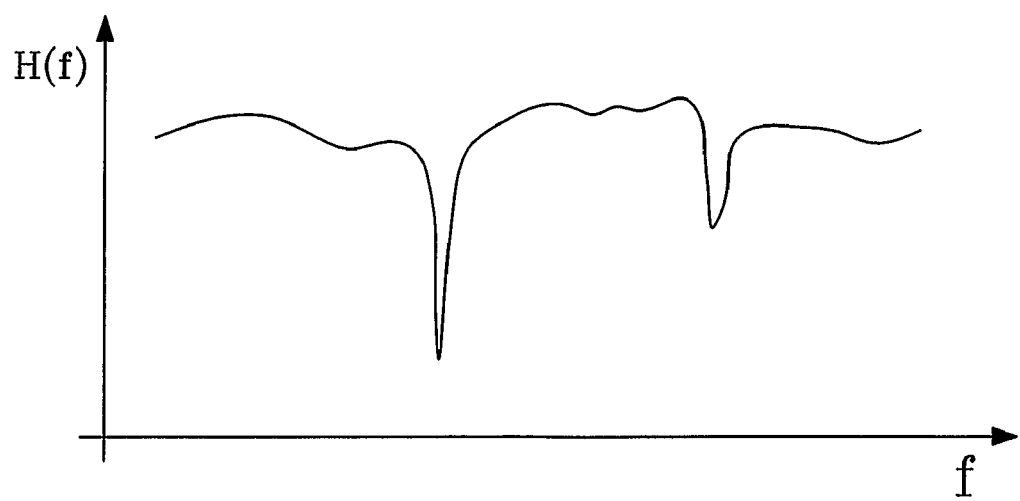
FIG. 2b shows a corresponding channel frequency response.

FIG. 1 shows a transmitter unit 11 and a receiver unit 12 communicating with each other via a multipath channel 14. In many radio channels the signal transmitted by the transmitter unit 11 reaches the receiver unit 12 via more than one path. For example, in a mobile communication environment, the transmitted signal is reflected off a variety of scatterers 13 such as buildings, trees, or moving vehicles. Thus, in addition to the direct path from the transmitter to the receiver, there are several other indirect paths, arising from the presence of the scatterers 13, that contribute to the composition of the received signal. The contributions from these indirect paths exhibit different signal attenuations and time delays relative to that from the direct path, i.e. they may interfere with the contribution from the direct path either constructively or destructively at the receiver input. The signal components caused by the indirect paths are denoted multipath components and illustrated by a complex channel filter function either in the time domain as a channel impulse response, which is illustrated in FIG. 2a, or correspondingly as a channel frequency response in the frequency domain as illustrated in FIG. 2b. The channel impulse response in FIG. 2a illustrates the contributions of the various multipaths in terms of complex parameters, which within the scope of the present invention are reproduced, e.g., as an amplitude value $A_i$ and a phase value $\phi_i$ or any other appropriate representation of complex values. The channel impulse response also denotes the delay times $\tau_i$ for said various multipaths. Correspondingly, the channel frequency response in FIG. 2b illustrates the frequency selectivity of the multipath channel.

The method and arrangement according to the present invention intends to provide a channel measurement message format to efficiently inform the transmitter unit of measurements performed by the transmitter unit related to the channel filter function between said units. For this purpose it is necessary to define the message properties representing the channel that must be transmitted in a message according to the inventive format.

A first aspect that must be considered for the inventive message format relates to the representation of the channel filter function. Said function can be defined as a complex channel impulse response $h(\tau)$ in the time-domain or, alternatively, in the frequency domain as the channel frequency response $H(f)=F\{h(\tau)\}$, which is the Fourier-transform of said channel impulse response. Both representations can imply specific advantages depending on, e.g., how fast or easy a certain information can be retrieved from the one or other representation or depending on how the transmitter unit is going to use the channel information. The method according to the present invention allows without preconditions to apply either of said representations, e.g. on request of the transmitter unit.

A second aspect of the message format according to the present invention is the manner in which the channel filter function, in the time- or frequency domain, is represented in said message. For instance, the channel impulse response $h(\tau)$ as perceived by the receiver unit, is sub-divided into a number N of sub-functions $h_n(\tau)$ for which the expression $$f_{Rx}(h_0(\tau), \ldots, h_N(\tau))=h(\tau)+\epsilon_h$$

is at least approximately valid. $f_{Rx}(\bullet)$ denotes a modelling function for achieving the appropriate channel impulse response from a combination of said sub-functions while $\epsilon_h$ ($\epsilon_h \ll h(\tau)$) indicates the deviation of the modelled channel impulse response in the receiver unit compared to said channel impulse response $h(\tau)$. From this modelled channel impulse response the transmitter unit is able to re-create an estimate $$\hat{h}^{(n)}=f_{Tx}^{(n)}(h_0(\tau), \ldots, h_n(\tau)).$$

In an embodiment of the present invention said modelling function $f_{Rx}(\bullet)$ can advantageously be realised as a summing function such that the set of sub-functions at least approximately fulfil the requirement $$\sum_{n=0}^{N} h_n(\tau) = h(\tau) + \varepsilon_h.$$

The set of sub-functions $h_n(\tau)$ preferably comprises a kind of ranking with respect to their significance for the representation of the channel. $h_0(\tau)$ for instance may include the most essential channel components, e.g. the largest channel component or the first component in time, i.e. the path with the shortest time delay. The accuracy of the estimate $\hat{h}^{(n)}$ in the transmitter unit depends on the number N of sub-functions as each sub-function provides additional components of the channel impulse response but also on the number of sub-functions that are indicated to the transmitter unit.

As described for the time-domain, a corresponding sub-division into a number N of sub-functions applying an appropriate modelling function $g_{Rx}(\bullet)$ can be performed for the channel frequency response $H(f)$ as perceived by the receiver unit, i.e.

$$g_{Rx}(H_0(f), \ldots, H_N(f))=H(f)+\epsilon_H.$$

Further, the method according to the present invention is improved over prior art solutions in the respect that it does not only allow a complete transmission of the channel filter function in one go or an incremental update of a single real value but instead does not restrict the possibility to transmit either representations of the actual values of said function or representations of incremental values. Thus, a third aspect of the channel measurement message format relates to the characteristic of the transmitted information of the sub-functions, i.e. whether it represents actual or incremental values. In a first alternative, the message contains only the actual values in terms of amplitude, phase, and time or frequency of the channel filter function. Such a report, which is denoted a basic report, can be advantageous as the first report transmitted from the receiver unit to the transmitter unit or in case of fast and/or significant changes of the channel properties, e.g. caused by a moving obstacle within the channel propagation area. It is another alternative to transmit incremental reports, which denote changes of the complex filter function values. This implies changes of the complex values for the various channel filter sub-functions compared to the previous report or, when applicable, deviations of the actual channel filter function from a modelled filter function, which can be obtained by a, e.g. linear, interpolation of the already reported filter function. In general, the estimate $h^{(k)}(\tau)$ of a reported new measurement value of the channel filter function in the transmitter unit can be regarded as the sum of the new measurement value $h_k(\tau)$ and a weighted value representing previously reported values, i.e.

$$h^{(k)}(\tau)=\alpha \cdot h^{(k-1)}(\tau)+h_k(\tau).$$

A weighting value $\alpha+0$ represents thus a basic report as it does not include any previous information while a value $\alpha>0$ represents an incremental report, which takes to a certain degree, depending on the value for $\alpha$, previous measurement values into account. Yet another advantage when using said weighting factor relates to the handling of faulty channel measurement reports, in particular incremental reports, where the influence of faults in previous measurements can possibly be suppressed by help of a temporary decreased weighting factor $\alpha$ for said measurements. For a basic report on the other hand, it might turn out to be appropriate to apply additional protection measures against transmission faults.

Finally, a fourth aspect of the present invention relates to the degree of accuracy with which the channel function measurements are represented in a channel filter measurement message. This can be controlled by means of selecting an appropriate sampling of the channel filter function in the time- or frequency domain. The easiest alternative is to apply fixed sampling rates $t_s$ or $f_s$ for representing the channel filter function in the respective domain. A fixed sampling rate implies the advantage that the message format representing the sub-functions of the channel filter function does not need any additional indication of the sampling rate. However, this approach is sufficient only in case of a channel with little variations over time or frequency. Preferably, the sampling is performed with varying sampling rates, which allows, e.g. to apply a first sampling rate for providing a basic report of a rough representation of the channel sub-functions and then providing a number of incremental reports which apply successively finer sampling of the channel sub-functions. Said incremental reports can contribute with actual values or, in particular in the frequency domain, denote a deviation from an interpolation of previously measurement values whereas interpolations in the time-domain only fulfil a purpose in case of dense sampling rates. In general it is possible to apply appropriately selected sample times $\tau_s$ or sample frequencies $f_s$, which, however, must be indicated in the channel measurement message as explained below.

FIG. 3 shows an example of the channel measurement message format according to the present invention. Said message format consists at least of a payload portion 32 including for one or several of the sub-divided parts of the channel filter function the reproductions 322 of said parts, e.g. in terms of an amplitude value $A_i$ and a phase value $\phi_i$ as described above. Optionally, said message format also includes a header portion 31 providing information about the manner of representing the payload information. This header portion 31 is optional for those cases where the content format of said payload portion 32 is predetermined and thus already known to the receiver of messages according to this message format. One example of the content of the header portion is an indication ($\alpha$) 312 whether the payload portion 32 represents a basic report, i.e. actual channel filter function values, or a report, which is incremental to certain degree denoted by a value $\alpha>0$. In a simple embodiment it would already be sufficient to define $\alpha$ as a binary value, which only distinguishes between basic report and incremental report. Another example is a field (T/F) 311 indicating whether the channel measurement information refers to a representation of the channel filter function in the time- or frequency domain. Finally it can turn out to be useful to provide an indication 313 of the sample base, i.e. whether the measurement is performed periodically in the time- or frequency domain. However, if the contributions of the sub-divided parts of the channel filter function shall instead be reported for any time or frequency instance ($\tau_i$ or $f_i$), these instances are indicated in a field 321 together with the reproductions 322 of the complex parameters.

Channel measurement messages can be transmitted at periodic instances of time or when it is considered to be necessary either by the receiver unit or the transmitter unit. Events that trigger the receiver unit to send a measurement message of the channel filter function are, e.g., a detected fast change of the channel properties or, e.g., that the transmitter unit detects or is notified of a deviation between the actual channel properties and the modelled or determined channel function in response to subsequent incremental reports from the receiver unit. The transmitter unit itself can influence the reporting of the channel filter function by the receiver unit by means of transmitting an appropriate transmitter message to the receiver unit. The message format for said transmitter message is similar to that of the channel measurement message. In a first embodiment said message only contains an indication of the type of channel measurement message that is requested next by the transmitter unit. The request can specify, e.g., whether the next channel measurement message denotes a representation of the channel filter function in the time- or frequency domain and/or the weighting factor $\alpha$ denoting to which degree the complex parameter values of said function are represented as actual values or incremental values. In addition to this, a second embodiment of said transmitter message also includes amplitude and phase values, and the according time or frequency instances if necessary, of a model of the channel filter function, which is applied in the transmitter unit. The receiver unit can then apply this channel model as a reference for incremental reports in the channel measurement message.

The present invention can advantageously be applied in a mobile radio communication system for improving, e.g., power management of the downlink channel from a radio base station to a mobile terminal. In general, the invention makes it possible for a transmitter to utilise detailed knowledge of the channel without using excessive amounts of communication resources on the opposite direction link, which will increase the system capacity as well as the user-experienced performance.

The invention claimed is:

1. A method in a receiver unit to receive communication signals from a transmitter unit via a multi-path channel, said method comprising the steps of:
  estimating parameters of a channel filter function of said channel from said received communication signals from the transmitter unit;
  sub-dividing the channel filter function into two or more parts, a function of which representing an approximation of the estimated full channel filter function;
  representing the complex parameters of at least a selection of said parts of the channel filter function as actual parameter values, or as incremental values indicating the difference to a reference value; and,
  composing a channel measurement message to be transmitted to the transmitter unit of a portion including said parameter representations and a portion indicating the manner of representing said parameters.

2. The method according to claim 1, wherein said function performs a summing of the sub-divided parts of the channel filter function.

3. The method according to claim 1, wherein the sub-divided parts of the channel filter function comprise channel information of a ranked degree of significance.

4. The method according to claim 1, wherein the channel filter function is represented as a channel impulse response in the time-domain.

5. The method according to claim 4, wherein the complex parameters of the channel impulse response are reproduced as amplitude and phase values.

6. The method according to claim 4, wherein the primary sub-divided filter function includes a representation of one or more of the most significant channel components.

7. The method according to claim 6, wherein the most significant channel component is the component having the shortest delay.

8. The method according to claim 1, wherein the channel filter function is represented as a channel frequency response in the frequency-domain.

9. The method according to claim 8, wherein a complex parameter of the channel frequency response is reproduced at least as an amplitude value and optionally by an additional phase value.

10. The method according to claim 1, wherein the complex parameters of said parts of the channel filter function are represented by their actual values in case of a significant change compared to a previous reference value.

11. The method according to claim 10, wherein the reference value corresponds to a previous channel parameter representation.

12. The method according to claim 10, wherein the reference value corresponds to a modelled estimate of the channel filter function.

13. The method according to claim 12, wherein the modelled estimate is a interpolation of the channel filter function from the complex parameters of the channel filter function.

14. The method according to claim 12, wherein said modelled estimate of the channel filter function has been received by the transmitter unit.

15. An apparatus for processing communication signals received via a multipath channel, comprising:
- means for estimating parameters of a channel filter function of said channel from said received communication signals from the transmitter unit;
- means for sub-dividing the channel filter function into two or more parts, a function of which representing the estimated full channel filter function;
- means for representing the complex parameters of at least a selection of the sub-divided channel filter function as actual parameter values, or as incremental values indicating the difference to a reference value; and,
- means for composing a channel measurement message to be transmitted to the transmitter unit including said set of parameter representations and a header field indicating the manner of representing said parameters.

16. The apparatus according to claim 15, which is integrated in a mobile user equipment.

* * * * *